United States Patent
Park et al.

(10) Patent No.: US 8,570,429 B2
(45) Date of Patent: Oct. 29, 2013

(54) IMAGE PROCESSING METHOD AND APPARATUS AND DIGITAL PHOTOGRAPHING APPARATUS USING THE SAME

(75) Inventors: Su-jung Park, Suwon-si (KR); Soon-ea Kim, Suwon-si (KR); Seung-yun Lee, Suwon-si (KR); I-saac Lee, Suwon-si (KR); Byoung-kwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 668 days.

(21) Appl. No.: 12/713,450

(22) Filed: Feb. 26, 2010

(65) Prior Publication Data

US 2010/0220208 A1 Sep. 2, 2010

(30) Foreign Application Priority Data

Feb. 27, 2009 (KR) ........................ 10-2009-0017135
May 11, 2009 (KR) ........................ 10-2009-0040894

(51) Int. Cl.
*H04N 5/232* (2006.01)
*G03B 13/00* (2006.01)

(52) U.S. Cl.
USPC .......................................... 348/348; 348/345

(58) Field of Classification Search
USPC ........................................................ 348/348
See application file for complete search history.

(56) References Cited

U.S. PATENT DOCUMENTS

| 2006/0268101 | A1* | 11/2006 | He et al. ..................... 348/14.12 |
| 2009/0015681 | A1* | 1/2009 | Pipkorn ................... 348/208.12 |
| 2009/0141141 | A1* | 6/2009 | Onozawa ................... 348/222.1 |
| 2009/0147107 | A1* | 6/2009 | Kawahara et al. ......... 348/240.2 |
| 2009/0167930 | A1* | 7/2009 | Safaee-Rad et al. .......... 348/347 |

* cited by examiner

*Primary Examiner* — Anthony J Daniels
(74) *Attorney, Agent, or Firm* — Drinker Biddle & Reath LLP

(57) ABSTRACT

Provided are a digital photographing apparatus and method of performing different degrees of image processing on one or more faces in an image according to the distances of faces from the digital photographing apparatus or whether auto-focusing has been performed on the faces. Also provided are a digital photographing apparatus and method of performing different degrees of image processing which assist in preventing faces at farther distances from appearing more processed, for example, more blurred, than faces at closer distances and which assist in preventing faces that have not been auto-focused from appearing more processed, for example, more blurred, than faces that have been auto-focused.

4 Claims, 10 Drawing Sheets

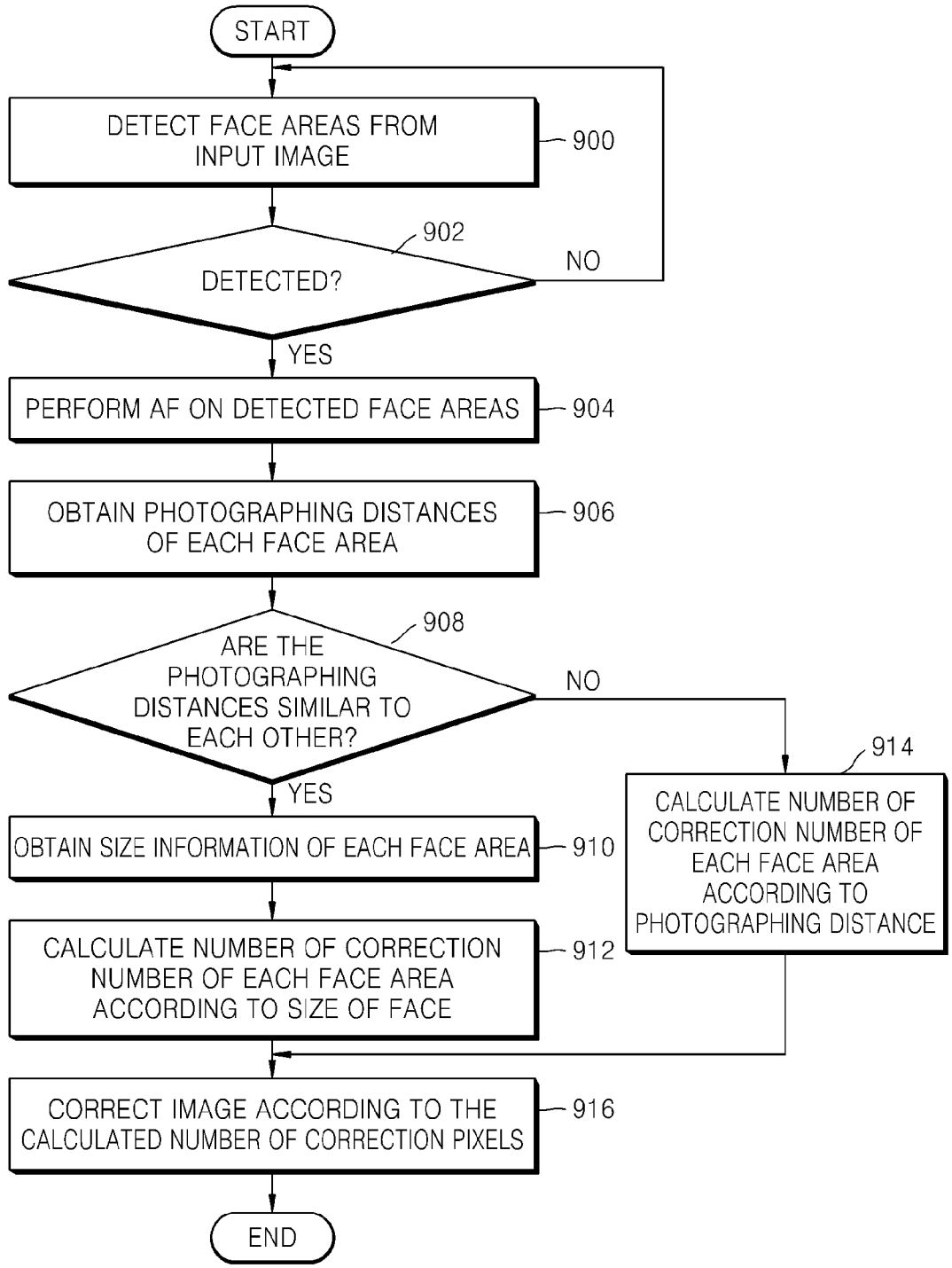

IMAGE PROCESSING METHOD AND APPARATUS AND DIGITAL PHOTOGRAPHING APPARATUS USING THE SAME

CROSS-REFERENCE TO RELATED PATENT APPLICATION

This application claims the benefit of Korean Patent Application No. 2009-0017135, filed on, Feb. 27, 2009 and Korean Patent Application No. 2009-0040894, filed on, May 11, 2009 in the Korean Intellectual Property Office, the disclosure of which is incorporated herein in its entirety by reference.

BACKGROUND OF THE INVENTION

1. Field of the Invention

The present invention relates to image processing, and more particularly, to an image processing method and apparatus for softly processing the image quality of a face part of an image when the image is captured.

2. Description of the Related Art

Recently, technologies related to detecting a subject, for example, a face, from an image obtained by using a digital camera and processing the image according to a result of detecting the subject, that is, technologies such as adjusting white balance or controlling whether to emit flash according to the brightness of the subject, have increased in use.

Meanwhile, digital camera users desire to make photos look brighter and more beautiful. Also, the users have difficulties in downloading the photos stored in digital cameras to their PCs and editing the photos using an image editing program, such as Photoshop.

In response to the users' needs, recently released digital cameras are equipped with a "beauty mode" or similar mode which makes a face in a photo look brighter. When a user photographs a person in the "beauty mode", the user can obtain brighter and more beautiful photos, and, in particular, the skin of the face in the photos looks softer.

However, digital cameras perform the same degree of image processing on all persons recognized in images in a "beauty mode" or similar mode. In this case, when an image includes people at various distances from a photographing apparatus and auto-focusing is performed on faces at a near distance and auto-focusing is not performed on faces at a far distance, performing the same degree of image processing, for example, blurring, on all faces in the image results in at least some of the faces in the image appearing blurry. Also, an object found in the whole image to be corrected, e.g. a skin color of a face, is corrected by using a skin color as the same sized window. Thus, when a big face and a small face, for example, faces having different sizes, appear on the same image, the same degree of image processing, for example, averaging of adjacent pixels within the same sized window, is performed and may crush the small face. Furthermore, the same degree of image processing is performed for focused images and non-focused images and may blur images.

SUMMARY OF THE INVENTION

Provided are an image processing method and apparatus for performing different degrees of image processing on one or more faces in an image according to the distances of faces or whether the faces have been auto-focused. Also provided are an image processing method and apparatus, which assist in preventing non-focused faces and faces at far distances from appearing more blurry than auto-focused faces and faces at closer distances.

Also provided is a digital photographing apparatus using the image processing method and apparatus.

According to an aspect of the present invention, there is provided an image processing method comprising: detecting a first face area in an input image; calculating a distance to the first face area; and performing image processing on the first face area based on the distance to the first face area.

In an embodiment, the image processing method may further comprise: detecting a second face area in the input image at a distance different from the distance to the first face area; calculating the distance to the second face area; and performing image processing on the second face area differently from the first face area due to the difference in the distance to the second face area from the distance to the first face area.

In an embodiment, the image processing method may further comprise: determining whether auto-focusing has been performed on the first face area; and performing image processing on the first face area to a different degree if auto-focusing has been performed on the first face area than if auto-focusing has not been performed on the first face area.

In an embodiment, the image processing method may further comprise: detecting a second face area in the input image; and performing image processing on the first face area to a different degree than on the second face area.

In an embodiment, the image processing method may further comprise: before detecting the first face area from the input image, selecting one of an image processing mode and an image processing degree.

In an embodiment, the image processing performed is blurring.

According to another aspect of the present invention, there is provided an image processing method comprising: detecting at least two face areas in an input image; calculating distances to each of the at least two face areas; performing auto-focusing on one of the at least two face areas; and performing image processing on each of the at least two face areas at different degrees based on whether auto-focusing has been performed on each of the at least two face areas and the calculated distance to each of the at least two face areas.

According to another aspect of the present invention, there is provided a computer readable recording medium having recorded thereon a program for executing the image processing method.

According to another aspect of the present invention, there is provided an image processing apparatus comprising: a face region detector detecting a first face area in an input image; a distance calculator calculating a distance to the first face area; and a controller controlling an image processor to process the first face area according to the calculated distance.

In an embodiment, the face region detector detects a second face area in the input image at a distance different from the distance to the first face area, and the controller controls the image processor to perform processing on the second face area differently from the processing performed on the first face area due to the difference in the distance to the second face area from the distance to the first face area.

In an embodiment, the image processing apparatus may further comprise: an auto-focusing performing unit performing auto-focusing on the first face area, wherein the controller controls the image processor to perform processing on the first face area to a different degree than if auto-focusing had not been performed on the first face area.

In an embodiment, the face region detector detects a second face area in the input image, and the controller controls the image processor to process the first face area at a different degree than the second face area.

In an embodiment, the image processing apparatus may further comprise: an image processing mode selector selecting one of an image processing mode and an image processing degree for the input image.

In an embodiment, the image processing may be blurring.

According to another aspect of the present invention, there is provided an image processing apparatus comprising: a face region detector detecting a first face area and a second face area in an input image; a distance calculator calculating a first distance from the image processing apparatus to the first face area and a second distance from the image processing apparatus to the second face area; an auto-focusing performing unit performing auto-focusing on one of the first face area and the second face area; an image processor performing image processing on the first face area and the second face area at different image processing degrees; and a controller controlling the image processor to process the first face area according to the first distance and whether auto-focusing has been performed on the first face area and to process the second face area according to the second distance and whether auto-focusing has been performed on the second face area.

According to another aspect of the present invention, there is provided an image processing method comprising: detecting at least two face areas in an input image; obtaining photographing distances of the detected face areas; determining whether the obtained photographing distances are similar to each other; calculating the number of correction pixels for each face area according to the determination result; and correcting each face area according to the calculated number of correction pixels.

In an embodiment, the degree of the correcting is determined according to the number of correction pixels.

In an embodiment, the image processing method may further comprise: if it is determined that the photographing distances are similar to each other, obtaining size information about the detected face areas, wherein the number of correction pixels is calculated according to the obtained size information.

In an embodiment, wherein the calculating of the number of correction pixels comprises: calculating the number of correction pixels of a smaller face area of the detected face areas based on the number of correction pixels of a larger face area of the detected face areas.

In an embodiment, wherein, if it is determined that the photographing distances are not similar to each other, the number of correction pixels is calculated according to the photographing distance of each face area.

In an embodiment, the image processing method may further comprise; calculating a focal depth based on an AF lens position value of a face area of the detected face areas at a near distance, an AF lens position value of a face area of the detected face areas at a far distance, and a focal depth value, wherein the number of correction pixels is calculated to be inversely proportional to the calculated focal depth.

In an embodiment, wherein the correcting of the each face area comprises: correcting a skin color area of each face area by the calculated number of correction pixels.

In an embodiment, wherein the determining comprises: determining whether a difference value in the photographing distances between the detected face areas exceeds a predetermined threshold value.

According to another aspect of the present invention, there is provided an image processing apparatus comprising: a face area detector detecting at least two face areas in an input image; an AF performing unit obtaining photographing distances of the detected face areas; a controller determining whether the obtained photographing distances are similar to each other; a correction pixel calculator calculating the number of correction pixels for each face area according to the determination result; and an image correcting unit correcting each face area according to the calculated number of correction pixels.

In an embodiment, wherein the degree of the correcting is determined according to the number of correction pixels.

In an embodiment, the image processing apparatus may further comprise: a size information obtaining unit, if it is determined that the photographing distances are similar to each other, obtaining size information about the detected face areas, wherein the correction pixel calculator calculates the number of correction pixels according to the obtained size information.

In an embodiment, wherein the correction pixel calculator calculates the number of correction pixels of a smaller face area of the detected face areas based on the number of correction pixels of a larger face area of the detected face areas.

In an embodiment, wherein the correction pixel calculator calculates a focal depth based on an AF lens position value of a face area of the detected face areas at a near distance, an AF lens position value of a face area of the detected face areas at a far distance, and a focal depth value, and calculates the number of correction pixels to be inversely proportional to the calculated focal depth.

In an embodiment, wherein the image correcting unit corrects a skin color area of each face area by the calculated number of correction pixels.

In an embodiment, wherein the controller determines whether a difference value in the photographing distances between the detected face areas exceeds a predetermined threshold value.

BRIEF DESCRIPTION OF THE DRAWINGS

The above and other features and advantages of the present invention will become more apparent by describing in detail embodiments thereof with reference to the attached drawings in which:

FIG. 9 is a flowchart illustrating an image processing method according to another embodiment of the present invention.

DETAILED DESCRIPTION OF THE INVENTION

Hereinafter, the present invention will be described in detail by explaining embodiments of the invention with reference to the attached drawings. In the following description of the present invention, only essential parts for understanding operation of the present invention will be described and other parts may be omitted in order not to make the subject matter of the present invention unclear.

Also, the terms used in the specification and the claims should not be limited to conventional or lexical meanings and should be construed as having meanings and concepts corresponding to the technical idea of the present invention in order to most appropriately describe the present invention.

Figure 1:
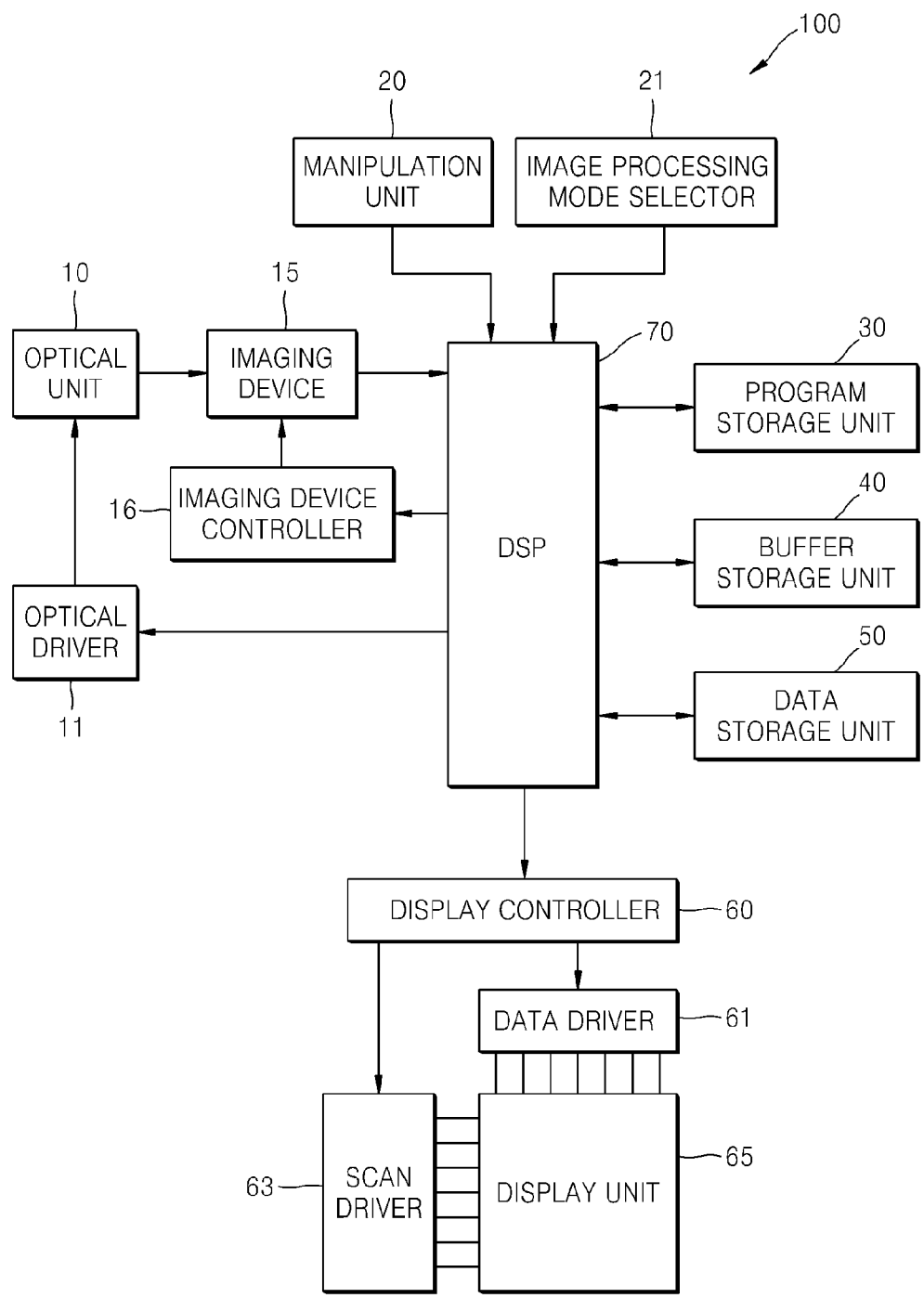
FIG. 1 is a block diagram of a digital photographing apparatus according to an embodiment of the present invention.
Figure 2:
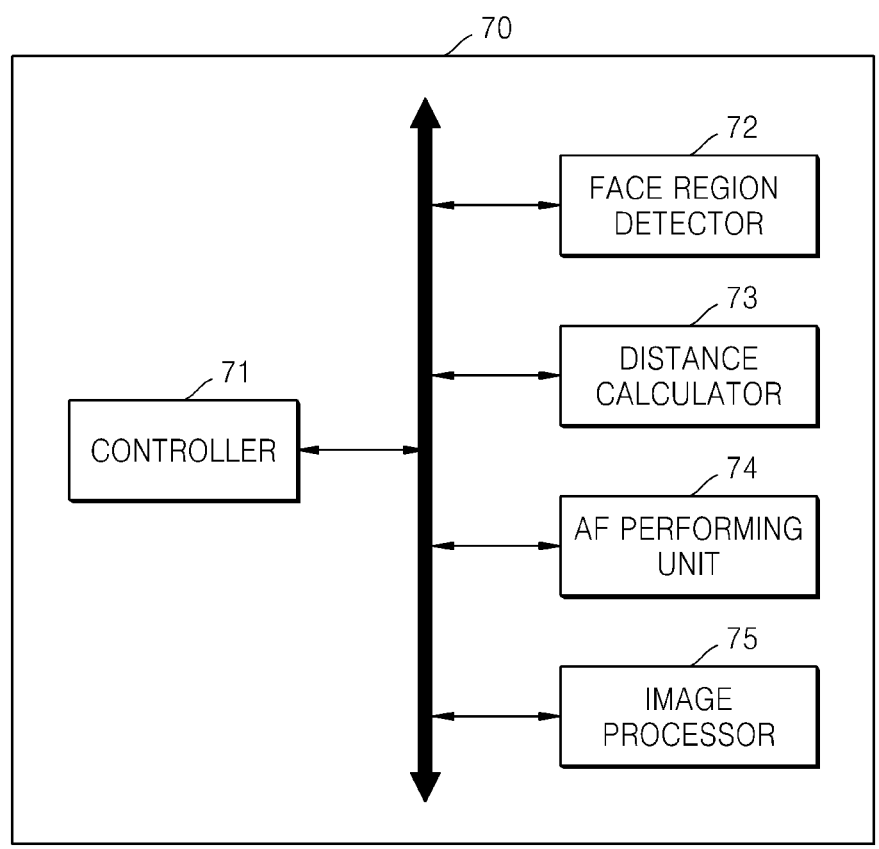
FIG. 2 is a block diagram of a digital signal processor (DSP) illustrated in FIG. 1.

FIG. 1 is a block diagram of a digital photographing apparatus 100 according to an embodiment of the present invention. FIG. 2 is a block diagram of a digital signal processor (DSP) included in the digital photographing apparatus 100 illustrated in FIG. 1.

Referring to FIG. 1, the digital photographing apparatus 100 includes an optical unit 10, an optical driver 11, an imaging device 15, an imaging device controller 16, a manipulation unit 20, an image processing mode selector 21, a program storage unit 30, a buffer storage unit 40, a data storage unit 50, a display controller 60, a data driver 61, a scan driver 63, a display unit 65, and the DSP 70.

The optical unit 10 receives an optical signal corresponding to a subject and provides the optical signal to the imaging device 15. The optical unit 10 includes at least one of a zoom lens that narrows or widens a viewing angle according to a focal length and a focus lens that focuses on the subject. Also, the optical unit 10 may further include an iris that controls the amount of light.

The optical driver 11 controls positioning of the zoom and focus lenses and opening of the iris. The subject may be focused according to the positioning of the zoom and focus lenses. Also, the amount of light may be controlled by controlling the opening of the iris. The optical driver 11 may control the optical unit 10 according to a control signal that is automatically generated in response to a real-time input image signal or a control signal that is input by a user's manipulation.

The optical signal of the optical unit 10 reaches a light-receiving surface of the imaging device 15 so as to form an image of the subject. The imaging device 15 may be a charge-coupled device (CCD) or a complementary metal-oxide semiconductor image sensor (CIS), which converts an optical signal into an electric signal. With respect to the imaging device 15, for example, the sensitivity of the imaging device 15 may be controlled by the imaging device controller 16. The imaging device controller 16 may control the imaging device 15 according to a control signal that is automatically generated in response to a real-time input image signal or a control signal that is input by the user's manipulation.

The manipulation unit 20 may receive a control signal input from outside the digital photographing apparatus 100, for example, by the user. The manipulation unit 20 includes various function buttons such as a shutter release button for taking a picture by exposing the imaging device 15 to light for a predetermined time, a power button for supplying power, wide-zoom and tele-zoom buttons for widening or narrowing the viewing angle according to an input, text input buttons, a mode selection button for selecting a photographing mode or a reproducing mode, and setting buttons for setting white balance and exposure. Although the manipulation unit 20 may include the above-described various buttons, the present invention is not limited thereto. The manipulation unit 20 may be implemented in any form, such as a keyboard, buttons, a ball or dial, a touch pad, a touch screen, or a remote controller, through which the user may input signals.

The image processing mode selector 21 receives an image processing mode with regard to a captured image from the user through any device through which the user may input signals, including, but not limited to, a keyboard, buttons, a ball or dial, a touch pad, a touch screen, or a remote controller. In this regard, the image processing mode can make the captured image look, for example, beautiful or as otherwise indicated by a user. In the present embodiment, blurring is performed with regard to a detected face region, and more particularly, with regard to a skin color region of the face region. Also, the user may select an image processing degree, for example, strong processing, intermediate processing, and weak processing by using, for example, the image processing mode selector 21 or a different button, dial, touch screen or other indicator, thereby selecting an image processing degree and whether image processing is performed on a picture of a person. In another embodiment, the processing degree may be indicated by setting a level, for example, level 1 through level 10 or level A through level D. Although the image processing mode selector 21 is separated from the manipulation unit 20 in the present embodiment, the manipulation unit 20 may also perform the function of the image processing mode selector 21 described above.

Furthermore, the digital photographing apparatus 100 includes the display controller 60 that controls to display an operation state of the digital photographing apparatus 100 and image data captured by the digital photographing apparatus 100, the data driver 61 and the scanning driver 63 that receive and transfer display data from the display controller 60, and the display unit 65 that displays a predetermined image according to signals input from the data driver 61 and the scanning driver 63. The display unit 65 may be formed of, for example, a liquid crystal display (LCD) panel, an organic light-emitting diode (OLED) panel, or an electrophoretic display (EPD) panel.

In addition, the digital photographing apparatus 100 includes the DSP 70 that processes input image signals and controls other elements according to the input image signals or external input signals.

The DSP 70 will now be described in detail with reference to FIGS. 1 and 2.

Referring to FIG. 1, the DSP 70 includes a controller 71, a face region detector 72, a distance calculator 73, an auto-focusing (AF) performing unit 74, and an image processor 75. The DSP 70 is the digital signal processor of an image processing apparatus according to an embodiment of the invention.

The controller 71 controls general operations of the DSP 70.

The face region detector 72 detects a face area from an image received from the imaging device 15. In more detail, the face region detector 72 detects an area having facial features, for example, a skin color area, a pupil area, a face shape area, etc., as the face area. The face region detector 72 may detect the skin color area from the detected face area.

There are many face area detection methods and algorithms that can be used to detect the face area in the present embodiment. For example, a motion vector method, a feature point detection method, an Adaboost learning method, and the like may be used to detect the face area.

The distance calculator 73 calculates a distance between the digital photographing apparatus 100 and the face area detected by the face area detecting unit 72. In this embodiment, the calculation of the distance is limited to each detected face area. Conventional technologies may be used to calculate the distance between the digital photographing apparatus 100 and a subject. For example, the distance between the digital photographing apparatus 100 and the subject may be calculated by using the number of pixels of the face area detected by the face area detecting unit 72, the CCD size, a focal lens distance, and a previously stored face size. The above-described method and other methods may be used to calculate the distance between the digital photographing apparatus 100 and the face area.

The controller 71 controls to differently perform image processing on the face area detected according to the distance calculated by the distance calculator 73. In more detail, when a plurality of face regions are detected from an input image, the controller 71 controls to differently perform image processing, i.e., blurring, on faces at near and far distances. Therefore, the same degree of blurring is performed on the faces at near and far distances, thereby preventing the faces at the far distance from being blurred more than the faces at the near distance.

The AF performing unit 74 performs AF processing on the face area detected by the face are detector 72. The AF processing is based on, in general, contrast detection, pan-focus, and phase difference, and the like. For example, a focus lens focuses on an AF area on which the contrast detection AF processing is to be performed, i.e., a lens position having the highest contrast value of detected face areas. In more detail, CCD contrast is converted into an electrical signal, a waveform of the electrical signal is analyzed, the focus lens is moved to a lens position having the largest high frequency component, and a subject for photographing is focused. In this regard, the AF performing unit 74 sends AF values of the detected face areas to the controller 71.

The controller 71 determines a face area corresponding to an auto-focused subject according to an AF processing result, determines a face area corresponding to the distance calculated by the distance calculating unit 73 and the auto-focused subject, and controls to differently perform image processing according to the determined face areas.

Figure 6:
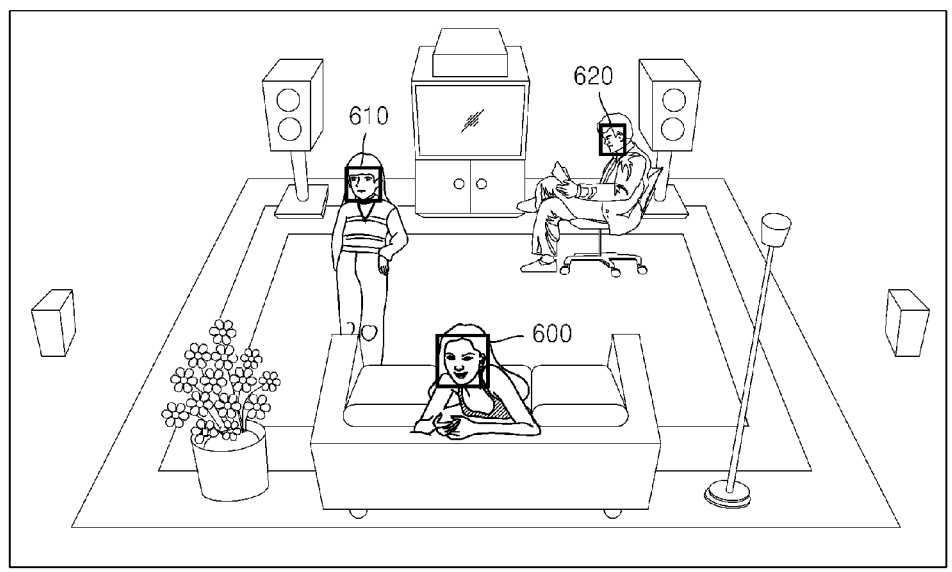
FIG. 6 is a view for explaining image processing performed by distances of subjects and of auto-focused subjects according to an embodiment of the present invention.

FIG. 6 is a view for explaining image processing performed by distances of subjects and of auto-focused subjects according to an embodiment of the present invention. Referring to FIG. 6, an input image includes three faces. In this regard, if the same blurring is performed on the three faces 600 through 620, the face area 620 at a far distance becomes more blurred than the other face areas 600 and 610. Thus, if blurring is differently performed on the three faces 600 through 620 according to the present embodiment, normal blurring or blurring having a blurring degree selected by a user is performed on the face areas 600 and 610, and blurring having a less blurring degree than that selected by the user is performed on the face area 620.

If auto-focusing is performed on the face area 600 of the current image, the face areas 610 and 620 for which the blurring is not performed become more blurred than the face area 600. In this regard, if the user selects an image processing mode, the face areas 610 and 620 on which the same blurring is performed become more blurred than the face area 600. Thus, if blurring is differently performed on auto-focused subjects according to the present embodiment, the normal blurring or the blurring having the blurring degree selected by the user is performed on the focused face areas 600 and 610, and blurring having a less blurring degree than that selected by the user is performed on the non-focused face area 620.

The controller 71 may differently perform image processing on the detected face areas 600 through 620 based on the two factors of a face area distance and an auto-focused subject. Referring to FIG. 6, when the user photographs the face area 610 and thus the face area 610 is focused, the normal blurring or the blurring having the blurring degree selected by the user is performed on the focused face area 610, and blurring having a less blurring degree than that selected by the user is performed on the face area 620 at the far distance.

The image processor 75 differently performs image processing on the face areas detected by the face region detector 72 under the control of the controller 71. In this regard, the image processing may be blurring. In the present embodiment, the blurring removes detailed parts of an image to make the image look soft and beautiful. In this regard, a filter is used for the image processing or the blurring to average pixel values, for example, a low band filter or a Gaussian blur filter.

Also, the differently performing of image processing is different degrees of image processing on a plurality of face areas. That is, image processing is performed on face areas which correspond or do not correspond to distances between the digital photographing apparatus 100 and face areas and auto-focused subjects have different processing degrees.

In general, the image processor 75 converts an image signal received from the imaging device 15 to a digital signal, and processes the image signal, such as gamma correction, color filter array interpolation, color matrix, color correction, color enhancement, or the like, so that the image signal is suitable for the viewpoint of a person.

When the image processor 75 is to process the image signal, an auto white balance or auto exposure algorithm may be performed. Also, the size of image data is adjusted by using a scaler, and an image file having a predetermined form by compressing the image data is formed. Alternatively, an image file may be decompressed. The image processor 75 may process an image signal, received in real time in a live-view mode before taking a photograph, and an image signal input according to a shutter release signal. In this regard, the image signals may be differently processed.

Figure 3:
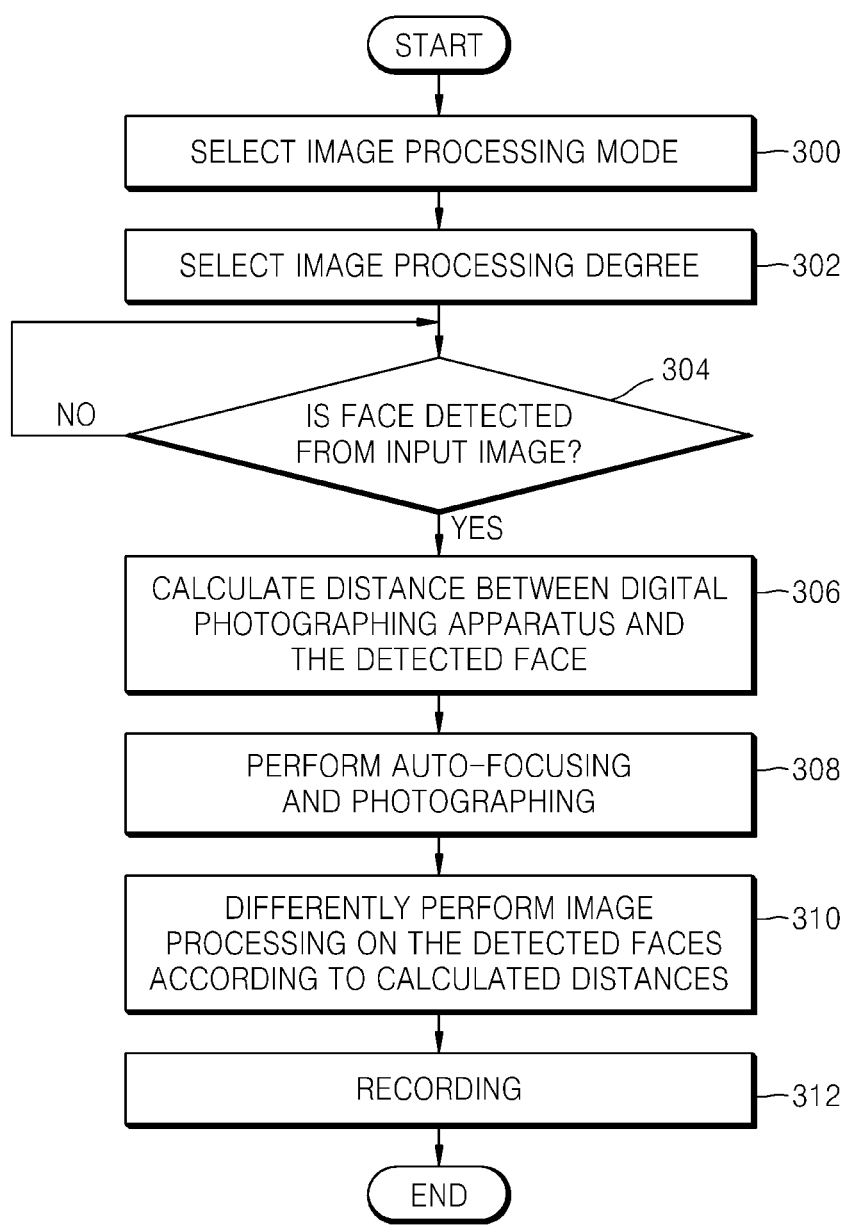
FIG. 3 is a flowchart illustrating an image processing method according to an embodiment of the present invention.

FIG. 3 is a flowchart illustrating an image processing method according to an embodiment of the present invention. Referring to FIG. 3, in operations 300 and 302, a user selects an image processing mode and an image processing degree. In this regard, image processing may be blurring, and include all types of image processing that makes a picture of a photographed person look brighter. Also, the image processing degree may be, for example, classified into a strong, an intermediate, and a weak image processing degree.

In operation 304, a face is detected from an input image. In this regard, the input image is a free-view image or a live view image, and a single face or a plurality of faces may be detected. The face or the plurality of faces may be detected by using conventional face detection algorithms.

In operation 306, a distance between a digital photographing apparatus and the defected face is calculated. In this regard, if a plurality of faces are detected, each distance between the digital photographing apparatus and each face is calculated. In operation 308, when the shutter is half-pressed S1 and fully pressed S2, auto-focusing is performed on the detected faces and the auto-focused faces are photographed.

In operation 310, image processing is differently performed on the detected faces according to the calculated distances. The differently performing of image processing refers to different degrees of image processing according to the calculated distances, for example, blurring. If a single face is detected, when the calculated distance is farther than a predetermined distance, i.e., when a subject is at a far distance, image processing having a less image processing degree than the image processing degree selected in operation 302 may be performed on the detected face, thereby preventing the face at the far distance from being more blurred due to the image processing.

If the plurality of faces are detected, image processing is differently performed on the detected faces according to distances, so that the same image processing is performed on the faces at near and far distances, thereby preventing the faces from being more blurred. In an embodiment, faces in an image are processed at different degrees based on their distance from a photographing apparatus. In an embodiment, faces at a farther distance are processed to a lesser degree than faces at a closer distance. In an embodiment, faces in an image are processed at different degrees based whether auto-focusing has been performed on the faces. In an embodiment, faces that have not been auto-focused are processed to a lesser degree than faces that have been auto-focused. In an embodiment, some of the faces in an image are processed, while other faces are not processed (i.e., processed at a degree of zero).

In operation 312, an image obtained by performing the image processing is recorded.

Figure 4:
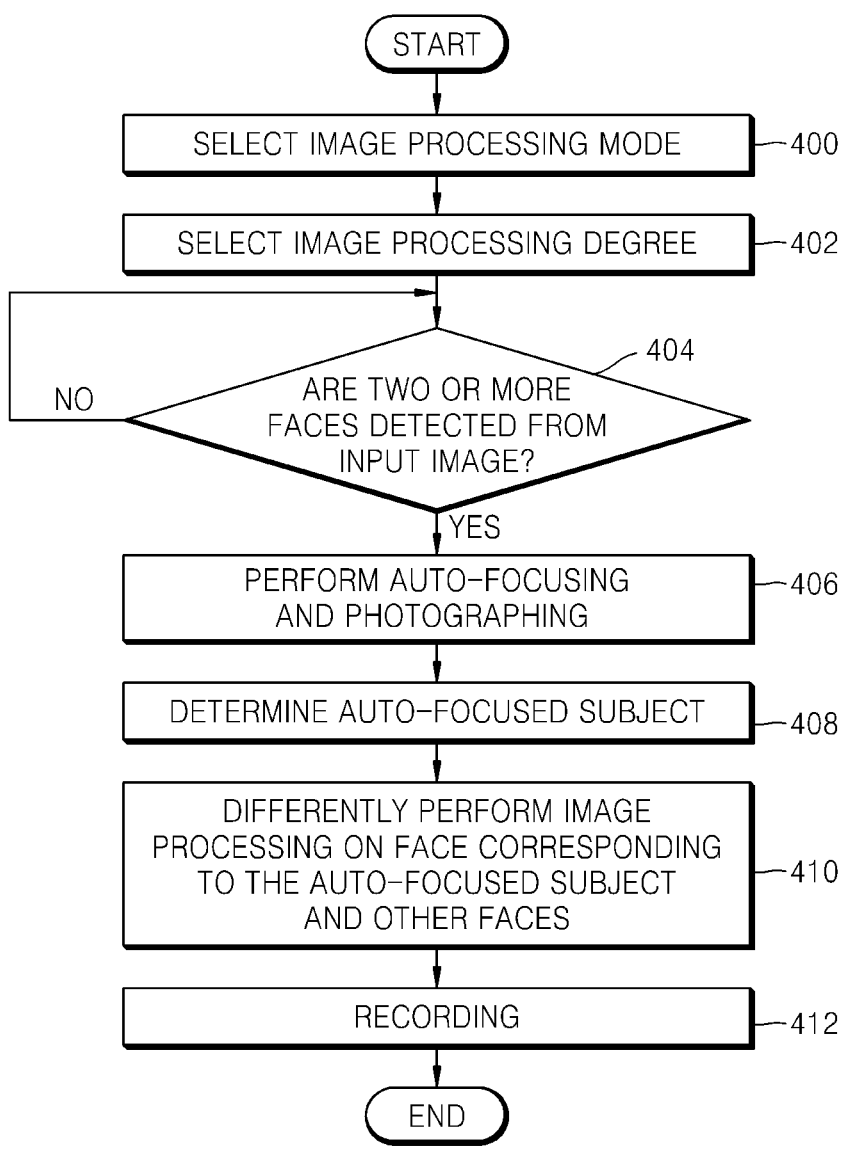
FIG. 4 is a flowchart illustrating an image processing method according to another embodiment of the present invention.

FIG. 4 is a flowchart illustrating an image processing method according to another embodiment of the present invention. Referring to FIG. 4, in operations 400 and 402, a user selects an image processing mode and an image processing degree. In this regard, image processing may be blurring, and include all types of image processing that makes a picture of a photographed person look brighter. Also, the image processing degree may be, for example, classified into a strong, an intermediate, and a weak image processing degree.

In operation 404, two or more faces are detected from an input image. In this case, the input image includes a plurality of faces.

In operation 406, when the shutter is half-pressed S1 and fully pressed S2, auto-focusing is performed on the detected faces and the auto-focused faces are photographed.

In operation 408, an auto-focused subject is determined from the captured image. That is, it is determined which face is focused from the detected faces.

In operation 410, image processing is differently performed on the face corresponding to the auto-focused subject and the other faces. In more detail, as a result of performing auto-focusing, image processing having the image processing degree selected in operation 402 is performed on the focused face among the plurality of faces, and image processing having a less image processing degree than the image processing degree selected in operation 402 is performed on the non-focused faces among the plurality of faces, thereby preventing a non-focused subject, which generally looks blurred, from being more blurred.

In operation 412, an image obtained by performing the image processing is recorded.

Figure 5:
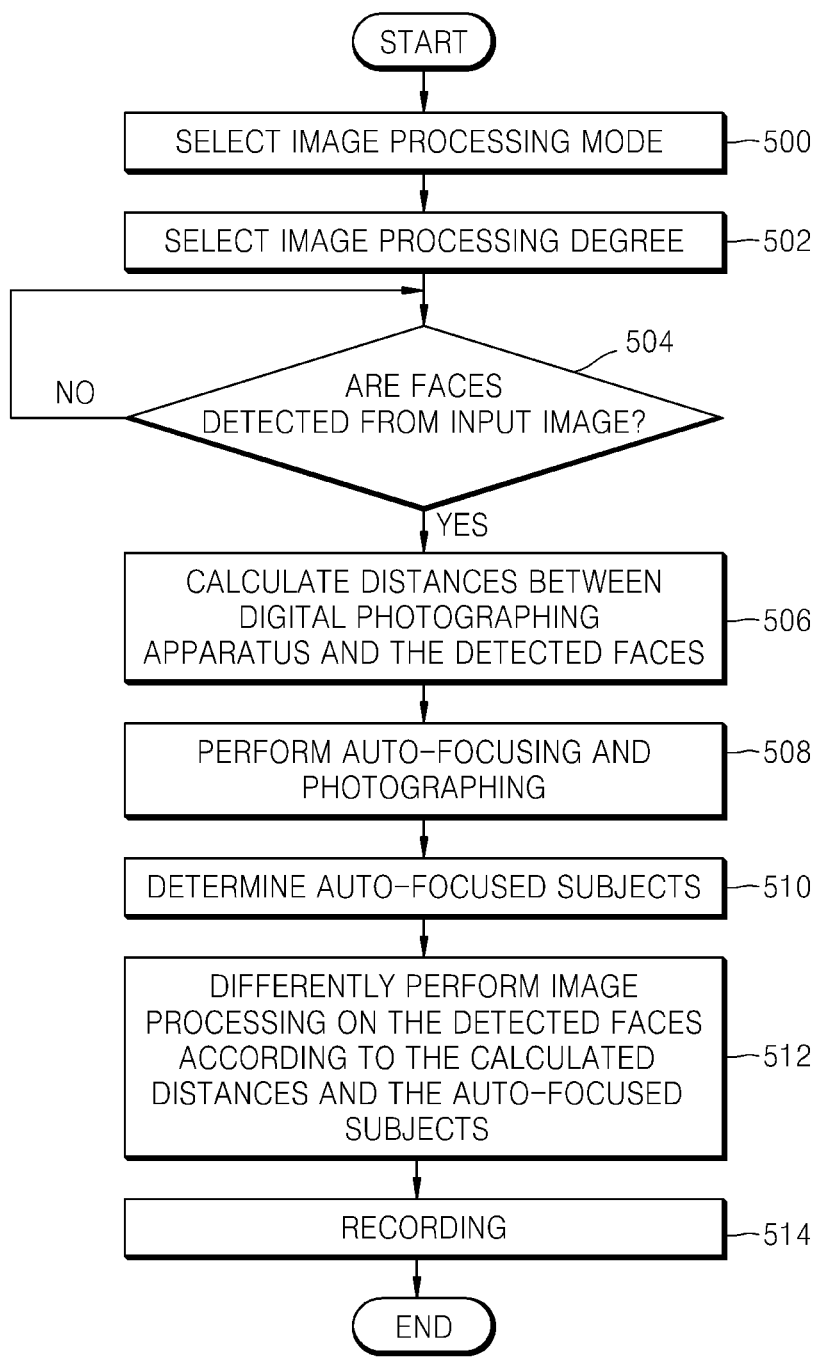
FIG. 5 is a flowchart illustrating an image processing method according to another embodiment of the present invention.

FIG. 5 is a flowchart illustrating an image processing method according to another embodiment of the present invention. Referring to FIG. 5, in operations 500 and 502, a user selects an image processing mode and an image processing degree. In this regard, image processing may be blurring, and include all types of image processing that makes a picture of a photographed person look brighter. Also, the image processing degree may be, for example, classified into a strong, an intermediate, and a weak image processing degree.

In operation 504, a face is detected from an input image. In this case, the input image may include at least two faces.

In operation 506, distances between a digital photographing apparatus and the defected faces are calculated. In operation 508, when the shutter is half-pressed S1 and fully pressed S2, auto-focusing is performed on the detected faces and the auto-focused faces are photographed.

In operation 510, a face corresponding to an auto-focused subject is determined.

In operation 512, image processing is differently performed on the detected faces according to the calculated distances and the auto-focused subjects. The performing of image processing differently is the same as or similar to that described with reference to FIGS. 3 and 4 above.

In operation 514, an image obtained by performing the image processing is recorded.

Figure 7:
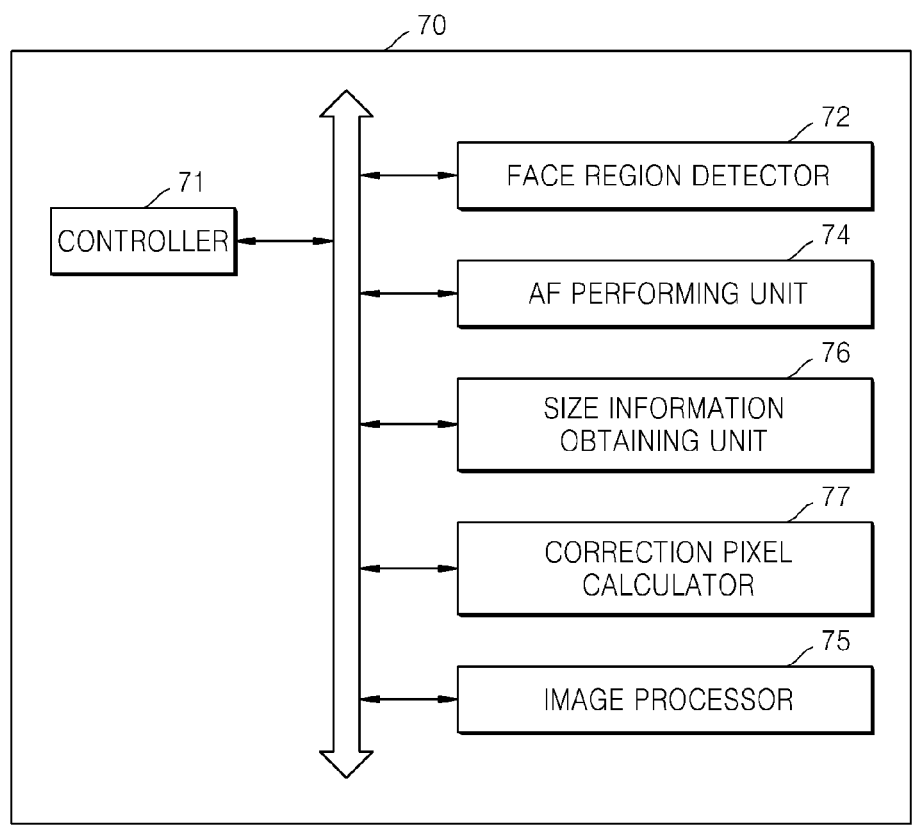
FIG. 7 is another block diagram of a digital signal processor (DSP) illustrated in FIG. 1.

FIG. 7 is another block diagram of a digital signal processor (DSP) illustrated in FIG. 1;

Referring to FIG. 1 and FIG. 7, the DSP 70 includes a controller 71, a face region detector 72, an auto-focusing (AF) performing unit 74, a size information obtaining unit 76, a correction pixel calculator 77, and an image processor 75. In this regard, the DSP 70 refers to an image processing apparatus recited in the claims.

The face region detector 72 detects a face area of an image received from the imaging device 15 or of an image on which image signal processing is performed by the image processor 75. In more detail, The face region detector 72 detects an area having facial features, for example, a skin color area, a pupil area, a face shape area, etc., as the face area. The face region detector 72 may detect the skin color area from the detected face area.

There are many face area detection methods and algorithms that can be used to detect a face area in the present embodiment. For example, a motion vector method, a feature point detection method, an Adaboost learning method, and the like may be used to detect the face area.

In the present embodiment, when an input image includes at least two face areas, different correction levels, i.e. different blurring levels, are applied to each face area, wherein different degrees of blurring are applied on faces at the same photographing distance or on the same focal surface according to sizes of faces, or wherein different degrees of blurring are applied on faces at different focal distances according to whether the faces are at near or far photographing distances or are focused or not.

The AF performing unit 74 performs AF processing on face areas detected by the face region detector 72. The AF processing is based on, in general, contrast detection, pan-focus, phase difference, and the like. For example, a focus lens focuses on an AF area at which the contrast detection AF processing is to be performed, i.e., on a lens position having the highest contrast value between detected face areas. In more detail, the contrast of CCD is converted into an electrical signal, a waveform of the electrical signal is analyzed, the focus lens is focused to a lens position having the largest high frequency component. In this regard, the AF performing unit 74 sends photographing distances of the detected face areas to the controller 71. In this regard, photographing distance information between a main subject face and auxiliary subject faces and the digital photographing apparatus 100, that is, distances between a lens and faces. For example, photographing distances may be about 50 cm~about 3 m. The controller 71 determines whether differences between the detected face areas and differences between photographing distances exceed a predetermined threshold value.

The size information obtaining unit 76 obtains size information about detected face areas according to the controller 71. The size information obtaining unit 76 obtains the size information about the detected face areas when faces included in the input image are at similar photographing distances, i.e., when each face area is on a similar focal surface. The size information about the detected face areas may be obtained by calculating the number of pixels of the detected face areas. For example, face size may be 14×14~n×n pixels. The size information about the detected face areas may be obtained by using other methods in addition to calculation of the number of pixels.

The correction pixel calculator 77 calculates the number of correction pixels, i.e., the number of pixels that are to be blurred, according to each face area. In this regard, the correction pixel calculator 77 calculates the number of correction pixels based on the size information about the detected face areas obtained by the size information obtaining unit 75 and the photographing distances provided by the AF performing unit 74.

Figure 8A:
FIGS. 8A and 8B are views for explaining calculation of the number of correction pixels according to another embodiment of the present invention.

Referring to FIG. 8, two face areas are detected from an input image on the same focal surface and are indicated in oval AF frames. The controller 71 may determine that two face areas are at similar photographing distances by using the photographing distances provided by the AF performing unit 74. The controller 71 obtains size information about each faces area through the size information obtaining unit 76. For example, the size information may include 100 as the size of an adult face and 42 as the size of a child face. In this regard, 100 and 42 may be equal to the product of the pixel width and the pixel length of a correction area. The number of correction pixels is proportional to a main subject face and may be obtained according to equation 1 below.

$$\text{Number of Correction Pixels} = int(\text{face size}_{sub}/\text{face size}_{main} \times \text{default size}) \qquad (1)$$

If the number of correction pixels of the adult face is the number of default pixels, for example, 10, the number of correction pixels of the child face is 4 according to equation 1, i.e., int(42/100×10)=4. Thus, different numbers of correction pixels according to face sizes, i.e., blurring levels, are used to correct two faces at similar photographing distances, thereby preventing the child face, which is smaller than the adult face, from being blurred. In other words, a lower number of pixels of a small face is blurred, thereby preventing the small child face from being crushed.

Although two faces may be at similar photographing distances, the greater a distance between a main face and a sub face included in an image, the smaller the resolutions of the faces. In other words, if the number of pixels constituting a position difference is M, the number of correction pixels may be established to be inversely proportional to M.

Figure 8B:
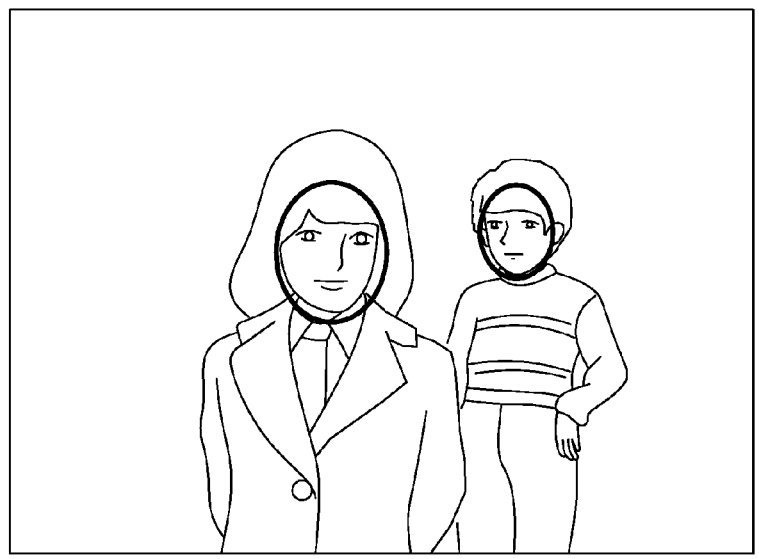

Referring to FIG. 8B, two face areas are detected from an input image, and are indicated in oval AF frames, and are at different photographing distances. The controller 71 determines that focus distances of the two face areas are not similar to each other by using the photographing distances provided by the AF performing unit 74. For example, if a photographing distance of a girl's face is 10, and a photographing distance of a boy's face is 30, the correction pixel calculator 77 calculates the number of correction pixels in accordance with each of the photographing distances. For example, if the number of correction pixels of the girl's face is 10, the number of correction pixels of the boy's face is 6. Thus, different numbers of correction pixels according to photographing distances are blurred on two faces at photographing distances that are not similar to each other, i.e., a greater number of correction pixels of the girl's face, which is closer to the camera than the boy's face, is blurred and a smaller number of correction pixels of the boy's face is blurred, thereby preventing the boy's face, which is at farther distance than the girl's face, from being blurred.

Focal degree of each face is determined so that the number of correction pixels can be established. In this regard, an allowable pulse with regard to deviation of a focal depth, i.e., a focus of an AF lens position, is used. In general, if a face at a near distance is focused, an AF lens position of the face at the near distance is Pos_Near, an AF lens position of a face at a far distance is Pos_Far, a focal depth rate is Pulse_CoverZone, and a rate of the degree of focal deviation is K, then K is calculated according to equation 2 below, $$K = |\text{Pos\_Near} - \text{Pos\_Far}|/\text{Pulse\_CoverZone} \qquad (2)$$

wherein, since the greater a value of K, the greater the focal deviation, the number of correction pixels is established to be inversely proportional to K. Thus, a smaller number of correction pixels of a face that is not focused is blurred, thereby preventing the face from being blurred.

The image processor 75 corrects a face area, in particular, a skin color area, according to the number of correction pixels calculated by the correction pixel calculator 77. In this regard, the correction may be blurring. In the present embodiment, the blurring removes detailed parts of an image to make the image look soft and beautiful. In this regard, a filter is used for the image processing or the blurring to average pixel values, for example, a low band filter or a Gaussian blur filter. That is, correction of pixels defines a range of averaged adjacent pixels. Therefore, correction of a great number of pixels averages a greater range of pixels and makes an image more blurry, and correction of a small number of pixels averages a smaller range of pixels and makes the image less blurry.

FIG. 9 is a flowchart illustrating an image processing method according to an embodiment of the present invention. Referring to FIG. 9, in operations 900 and 902, a face area is detected from an input image. At least two face areas may be detected from the input image. Detecting of the face areas may be performed by using a conventional face detection algorithm.

In operations 904 and 906, AF is performed for the detected face areas and a photographing distance of each face area is obtained. In operation 908, it is determined whether the obtained photographing distances are similar to each other. In this regard, when a main subject face and an auxiliary subject face are detected, it is determined whether the obtained photographing distances are similar to each other according to whether a difference in distances between a lens and the main subject face and between the lens and the auxiliary subject face exceeds a predetermined threshold value. The predetermined threshold value may be an arbitrarily established value. In more detail, if the difference in distances exceeds the predetermined threshold value, it is determined that the obtained photographing distances are not similar to each other, and if the difference in distances does not exceed the predetermined threshold value, it is determined that the obtained photographing distances are similar to each other.

In operation 908, when it is determined that the obtained photographing distances are similar to each other, in operation 910, size information about each face area is obtained. In operation 912, the number of correction pixels is calculated based on the obtained size information. In operation 916, the corresponding face area, in particular, a skin color area, is corrected by the number of correction pixels calculated according to the size information.

In operation 908, when it is determined that the obtained photographing distances are not similar to each other, in operation 914, the number of correction pixels is calculated based on the obtained photographing distances. In this regard, the photographing distances are distances between the corresponding face and a digital photographing apparatus, i.e., the lens. Alternatively, the number of correction pixels may be calculated based on a focal depth. In operation 916, the corresponding face area, in particular, the skin color area, is corrected by the number of correction pixels calculated according to the photographing distances. In this regard, the image correction may be blurring, and the blurring includes all image processing to make a face image look soft and beautiful.

Figure 10:
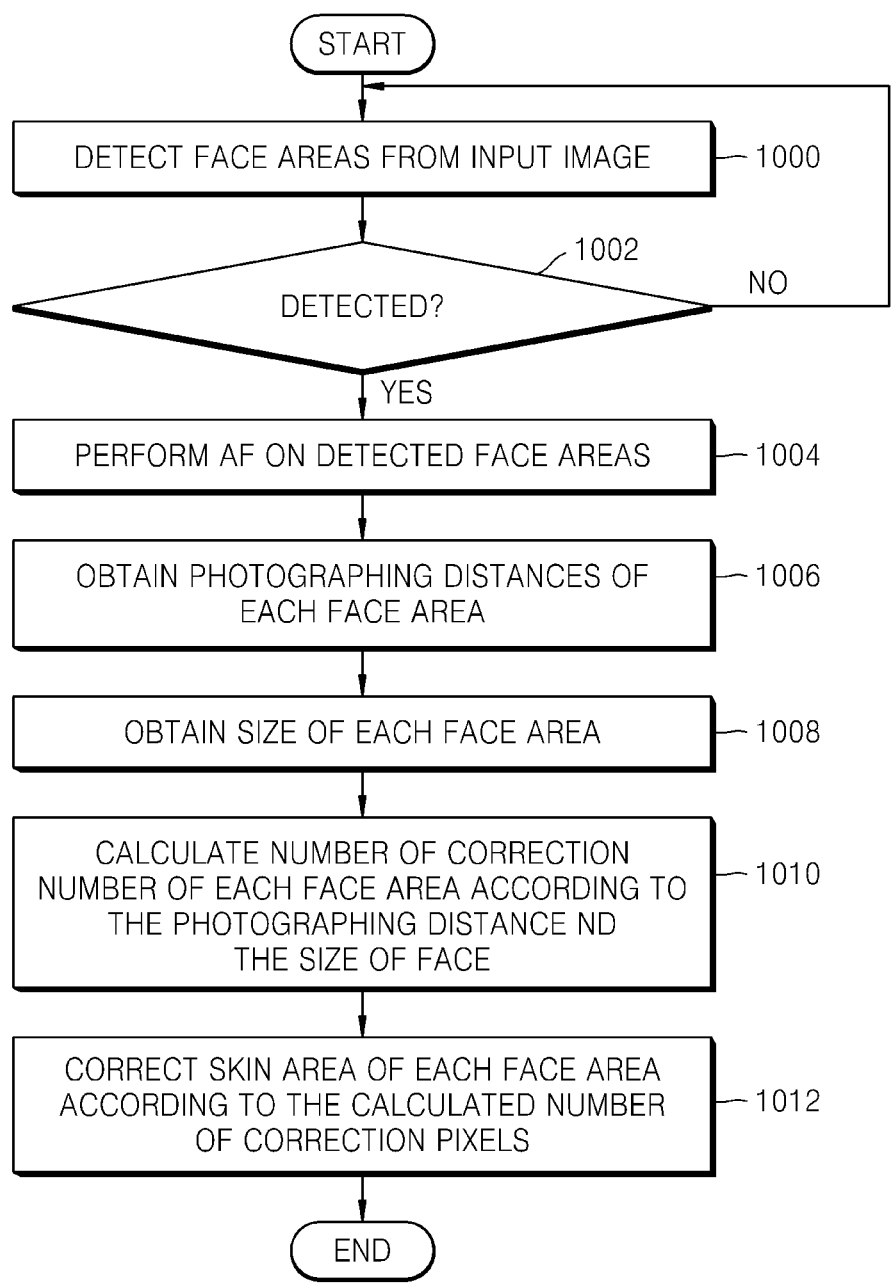
FIG. 10 is a flowchart illustrating an image processing method according to another embodiment of the present invention.

FIG. 10 is a flowchart illustrating an image processing method according to another embodiment of the present invention. Referring to FIG. 10, in operations 1000 and 1002, a face area is detected from an input image. At least two face areas may be detected from the input image. Detecting of the face areas may be performed by using conventional face detection algorithm.

In operation 1004, AF is performed for the detected face areas. In operations 1006 and 1008, a photographing distance and size information of each face area are obtained.

In operation 1010, the number of correction pixels is calculated based on the obtained photographing distances and size information. In this regard, if the photographing distance is closer, a greater number of correction pixels of the corresponding face area is blurred, if the photographing distance is farther, a smaller number of correction pixels of the corresponding face area is blurred. if the face size is larger, a greater number of correction pixels of the corresponding face area is blurred, and if the face size is smaller, a smaller number of correction pixels of the corresponding face area is blurred. The number of correction pixels may be relatively calculated and an optimal number of correction pixels may be established. That is, the number of correction pixels may be relatively calculated according to a photographing distance between a large face and a small face.

In operation 1012, the corresponding face area, in particular, a skin color area, is corrected by the calculated number of correction pixels.

In the embodiments described above, a digital camera is mainly discussed as an example of a digital photographing apparatus for applying the present invention, however the digital photographing apparatus is not limited thereto. It will be easily understood by one of ordinary skill in the art that the present invention may be applied to a camera phone, personal digital assistant (PDA), or a portable multimedia player (PMP) or other device having a camera function.

The present invention can also be embodied as computer readable code on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

The image processing method and apparatus of various embodiments of the present invention perform different degrees of image processing on a plurality of faces according to distances of faces, auto-focused faces, and non-focused faces, and prevent faces at far distances and non-focused faces from being more blurred.

While the present invention has been particularly shown and described with reference to embodiments thereof, it will be understood by one of ordinary skill in the art that various changes in form and detail may be made therein without departing from the spirit and scope of the present invention as defined by the following claims.

What is claimed is:

1. An image processing method comprising: selecting an image processing mode and an image processing degree for an input image; detecting at least two face areas in the input image; calculating distances to each of the at least two face areas; performing auto-focusing on one of the at least two face areas; and performing, using an image processor, image processing on each of the at least two face areas at different degrees based on whether auto-focusing has been performed on each of the at least two face areas and the calculated distance to each of the at least two face areas.

2. The image processing method of claim 1, wherein the image processing performed is blurring.

3. An image processing apparatus comprising: an image processing mode selector selecting an image processing mode and an image processing degree for an input image; a face region detector for detecting a first face area and a second face area in the input image; a distance calculator for calculating a first distance from the image processing apparatus to the first face area and a second distance from the image processing apparatus to the second face area; an auto-focusing performing unit performing auto-focusing on one of the first face area and the second face area; an image processor performing image processing on the first face area and the second face area at different image processing degrees; and a controller controlling the image processor to process the first face area according to the first calculated distance and whether auto-focusing has been performed on the first face area and to process the second face area according to the second calculated distance and whether auto-focusing has been performed on the second face area.

4. The image processing apparatus of claim 3, wherein the image processing performed is blurring.

* * * * *